3,005,715
STABILIZATION OF GRAPE FLAVORED SOFT DRINK MIXES CONTAINING METHYL ANTHRANILATE
Stanley P. Raffensperger, Palos Park, and Ralph D. Vogt, La Grange, Ill., assignors to General Foods Corporation, White Plains, N.Y., a corporation of Delaware
No Drawing. Filed Feb. 2, 1959, Ser. No. 790,332
4 Claims. (Cl. 99—78)

This invention relates to the stabilization of grape flavored soft drink beverages which contain methyl anthranilate. More particularly, it relates to the stabilization of such drinks containing methyl anthranilate in combination with dextrose.

Almost all grape flavors used commercially presently contain as the primary flavoring ingredient methyl anthranilate. Unfortunately, however, methyl anthranilate when in the presence of moisture, a reducing sugar such as dextrose, and acids such as citric acid, tartaric acid or malic acid reacts with the reducing sugar to form a brown insoluble product which often appears as a scum at the top of the beverage. To some extent, this material, while highly undesirable in such products, is not too noticeable because of the intense color of most grape flavored soft drink beverages. However, concurrent with the formation of this brown insoluble product is the loss of flavor intensity of the grape flavor which is very noticeable.

It is an object of this invention to prepare grape flavored soft drink beverages from dry mixes which are free from such brown insoluble products and which substantially retain the original flavor intensity even after prolonged storage.

It has now been found that a grape flavored soft drink beverage composition containing methyl anthranilate, a reducing saccharide typified by dextrose, and an acid selected from the group consisting of fumaric acid and adipic acid will result in beverages free from the undesirable brown insoluble product while substantially retaining the original flavor intensity.

It is believed that the insoluble brown product and decrease in flavor intensity are due to a reaction which takes place between the dextrose and the nitrogen group of the methyl anthranilate, the reaction possibly being a browning reaction of the amino acid-reducing sugar type. The citric acid which is relatively hydroscopic attracts sufficient moisture to permit the reaction between the methyl anthranilate and dextrose to take place. Fumaric acid and adipic acid have been found to be eminently satisfactory in preventing the formation of such brown insoluble products. However, where more than 5% moisture is present in a dry mix containing fumaric or adipic acid in place of citric acid in the above described compositions, the brown insoluble product will form upon rehydration of the beverage mix due to the presence of sufficient moisture in the dry mix to permit the browning reaction between the methyl anthranilate and dextrose to take place. Accordingly, in carrying out the present invention, the dry mix should not have a moisture content of more than 5%.

The following example illustrates one embodiment of the present invention:

| | Parts by weight |
|---|---|
| Grape flavor (containing 2–50% methyl anthranilate fixed in gum arabic) | 0.1 to 1.75 |
| Fumaric acid | 7.0 to 40.0 |
| Color | 0.1 to 1.25 |
| Dextrose—Sufficient to bring the total parts by weight to 100. | |

While the above invention has been described in part by the above example, reference should be had to the appended claims for a definition of the scope of the invention.

The present invention, while having been found to be eminently satisfactory in grape flavored beverage mixes, has also been found to produce eminently satisfactory results in other fruit flavored beverage mixes containing methyl anthranilate. Other fruit flavored beverage mixes containing methyl anthranilate would be beverage mixes of the fruit punch type which contain a combination of fruit flavors. These beverages vary considerably in flavor composition depending upon the ultimate flavor desired, although generally they contain, in addition to methyl anthranilate, a source of cherry flavor and may contain a source of strawberry flavor. A typical composition of such beverage mixes would be similar to that described above for the grape flavored beverage mix but the flavor components would contain other fruit flavors in addition to the grape flavor in the 0.1–1.7 parts by weight.

What is claimed is:
1. A process for preparing a fruit flavored soft drink mix which is stable against the formation of undesirable brown insoluble materials and which retains its original flavor intensity upon storage which comprises adding to a dry beverage mix containing methyl anthranilate and dextrose, an acid selected from the group consisting of fumaric acid and adipic acid.
2. A fruit flavored soft drink mix which comprises methyl anthranilate, fumaric acid and dextrose.
3. A grape flavored soft drink mix which comprises methyl anthranilate, fumaric acid and dextrose.
4. A grape flavored soft drink mix which is characterized by its freedom from undesirable brown insoluble materials and which retains its original flavor intensity on storage consisting of methyl anthranilate, an acid selected from the group consisting of fumaric acid and adipic acid, and dextrose.

References Cited in the file of this patent
UNITED STATES PATENTS

| | | |
|---|---|---|
| 2,463,962 | Gorcica et al. | Mar. 8, 1949 |
| 2,694,641 | Atwood et al. | Nov. 16, 1954 |
| 2,868,646 | Schapiro | Jan. 13, 1959 |